(12) United States Patent
Yoshii

(10) Patent No.: US 8,532,868 B2
(45) Date of Patent: Sep. 10, 2013

(54) ACCELERATION/DECELERATION DETECTING SYSTEM

(75) Inventor: Yuji Yoshii, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/578,160

(22) PCT Filed: Feb. 10, 2010

(86) PCT No.: PCT/JP2010/051996
§ 371 (c)(1),
(2), (4) Date: Aug. 9, 2012

(87) PCT Pub. No.: WO2011/099133
PCT Pub. Date: Aug. 18, 2011

(65) Prior Publication Data
US 2012/0310473 A1    Dec. 6, 2012

(51) Int. Cl.
*G01M 17/00*  (2006.01)
(52) U.S. Cl.
USPC .......................................... 701/33.1
(58) Field of Classification Search
USPC .......................................... 701/33.1
See application file for complete search history.

(56) References Cited

U.S. PATENT DOCUMENTS

| 5,566,094 | A | * | 10/1996 | Kojima et al. | 702/87 |
| 6,055,841 | A | | 5/2000 | Yamada et al. | |
| 2004/0138836 | A1 | * | 7/2004 | Ishishita et al. | 702/63 |
| 2008/0140291 | A1 | * | 6/2008 | Kobayashi et al. | 701/70 |

FOREIGN PATENT DOCUMENTS

| JP | 2 19771 | 1/1990 |
| JP | 2 163663 | 6/1990 |
| JP | 7 174787 | 7/1995 |
| JP | 8 334529 | 12/1996 |
| JP | 10 307032 | 11/1998 |
| JP | 11 248743 | 9/1999 |
| JP | 11 281672 | 10/1999 |
| JP | 2000 137039 | 5/2000 |
| JP | 2000 356647 | 12/2000 |
| JP | 2004 325095 | 11/2004 |

OTHER PUBLICATIONS

International Search Report Issued Mar. 16, 2010 in PCT/JP10/51996 Filed Feb. 10, 2010.
International PReliminary Examination Report Issued Jan. 31, 2012 in PCT/JP10/51996 Filed Feb. 10, 2010.

* cited by examiner

*Primary Examiner* — Mary Cheung
*Assistant Examiner* — Anne Mazzara
(74) *Attorney, Agent, or Firm* — Oblon, Spivak, McClelland, Maier & Neustadt, L.L.P.

(57) ABSTRACT

An acceleration/deceleration detecting system includes an acceleration/deceleration detector configured to be disposed in a measurement object and detect acceleration/deceleration of the measurement object, an acceleration/deceleration device configured to accelerate or decelerate the measurement object, and a calculation device configured to determine that a detection value of the acceleration/deceleration detector is an offset error or a detection error of the acceleration/deceleration detector, when an actual acceleration/deceleration direction of the measurement object is different from an acceleration/deceleration direction shown by a detection value of the acceleration/deceleration detector in a state that the measurement object is accelerated or decelerated by the acceleration/deceleration device.

10 Claims, 5 Drawing Sheets

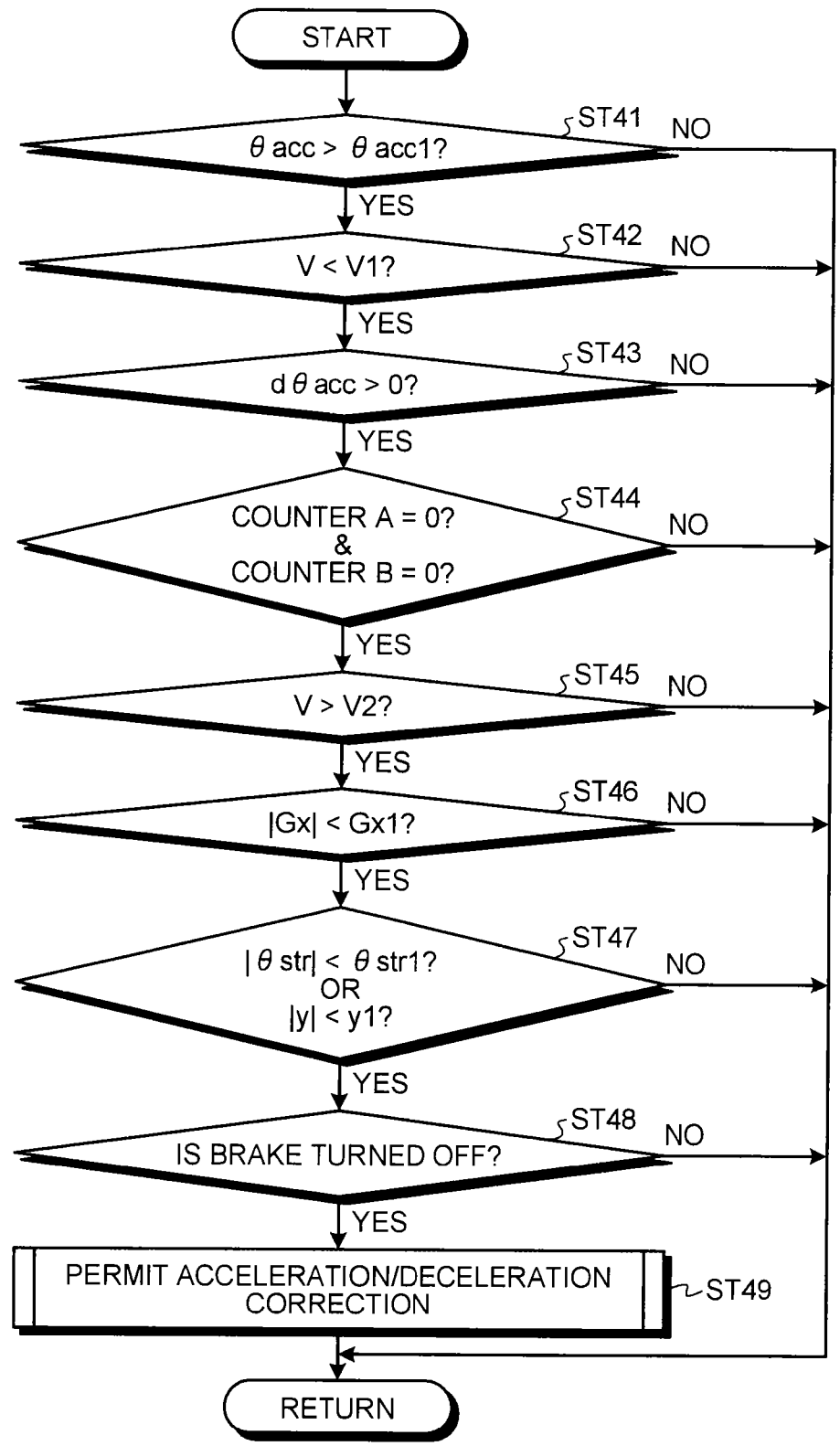

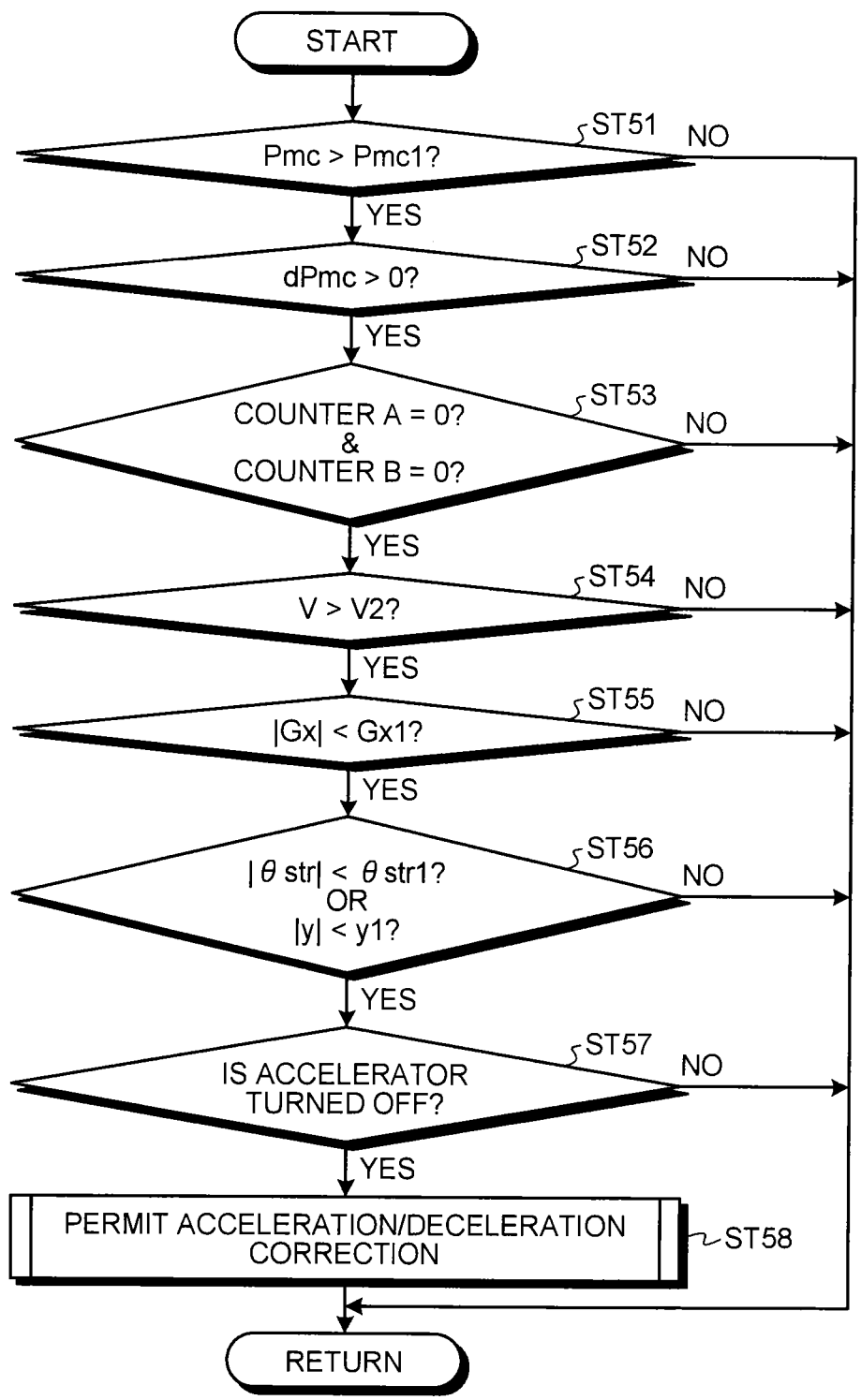

ACCELERATION/DECELERATION DETECTING SYSTEM

FIELD

The present invention relates to an acceleration/deceleration detecting system for detecting acceleration/deceleration of a body as a measurement object.

BACKGROUND

Conventionally, an acceleration/deceleration detector such as an acceleration sensor is known which detects acceleration/deceleration of a body to be measured (hereinafter, called "measurement object"). For example, Patent Literature 1 described below discloses a technology for detecting forward/backward accelerations by a forward/backward acceleration sensor while a vehicle travels in a predetermined vehicle speed region in which driving/braking force is substantially 0 a predetermined number of times, setting an average value of the forward/backward accelerations as a zero point offset value of the forward/backward acceleration sensor, and calibrating the detection value of the forward/backward acceleration sensor by the zero point offset value. Further, Patent Literature 2 described below discloses a technology for detecting a forward/backward acceleration by an acceleration sensor in a state that a vehicle stops as well as further detecting a forward/backward acceleration in a state that the vehicle is inverted its direction at the position where the vehicle stops and is stopped again and using an average value of the forward/backward accelerations as an offset error of the acceleration sensor.

Note that Patent Literature 3 described below discloses a technology for determining that an acceleration sensor is abnormal when an output value of the acceleration sensor exceeds only any one of an acceleration reference value or a deceleration reference value and a time during which the output value exceeds any one of them exceeds a reference time. Further, Patent Literature 4 described below discloses a technology of an apparatus which includes an acceleration detecting hole element disposed at a center, an annular rotor that rotates around the hole element, and a rotating position detecting means for detecting a rotating position of the rotor, calculates acceleration applied to the rotor based on a rotating position at which the rotor is kept until the rotor rotates 180° and on the rotating position detected by the rotating position detecting means, and cancels a drift amount which is an offset error of an acceleration sensor.

CITATION LIST

Patent Literature

Patent Literature 1: Japanese Patent Application Laid-open No. H11-248743
Patent Literature 2: Japanese Patent Application Laid-open No. 2000-356647
Patent Literature 3: Japanese Patent Application Laid-open No. H07-174787
Patent Literature 4: Japanese Patent Application Laid-open No. H08-334529

SUMMARY

Technical Problem

However, since the technology of Patent Literature 1 determines the offset error using the detection value when the driving/braking force is substantially 0, that is, since the determination is made when the vehicle is not in an accelerating operation state or in a decelerating operation state, a deceleration component due to an engine brake and the like is contained in the detection value, and thus that a calculation accuracy of the offset error may be lowered. Further, the technology of Patent Literature 2 forces a driver to perform a specific operation to determine the offset error. Further, there is also a possibility that a detection error due to deterioration across ages and the like occurs in the acceleration/deceleration detector in addition to the inherent indispensable offset error.

Accordingly, an object of the present invention is to improve the disadvantage of the conventional examples and to provide an acceleration/deceleration detecting system capable of determining a detection error or an offset error of an acceleration/deceleration detector with a high accuracy.

Solution to Problem

In order to achieve the above mentioned object, an acceleration/deceleration detecting system according to the present invention includes an acceleration/deceleration detector configured to be disposed in a measurement object and detect acceleration/deceleration of the measurement object; an acceleration/deceleration device configured to accelerate or decelerate the measurement object; and a calculation device configured to determine that a detection value of the acceleration/deceleration detector is an offset error or a detection error of the acceleration/deceleration detector, when an actual acceleration/deceleration direction of the measurement object is different from an acceleration/deceleration direction shown by a detection value of the acceleration/deceleration detector in a state that the measurement object is accelerated or decelerated by the acceleration/deceleration device.

Further, in order to achieve the above mentioned object, an acceleration/deceleration detecting system according to the present invention includes an acceleration/deceleration detector configured to be disposed in a measurement object and detect acceleration/deceleration of the measurement object; an acceleration/deceleration device configured to accelerate or decelerate the measurement object; and a calculation device configured to determine an offset error or a detection error of the acceleration/deceleration detector and correct a detection value of the acceleration/deceleration detector based on the offset error or the detection error, when an actual acceleration/deceleration direction of the measurement object is different from an acceleration/deceleration direction shown by the detection value of the acceleration/deceleration detector in a state that the measurement object is accelerated or decelerated by the acceleration/deceleration device.

Here, it is desirable that when the measurement object is a vehicle, a calculation processing operation of the calculation device is executed when a behavior of the vehicle is in a stable state.

Further, it is desirable that when the measurement object is a vehicle, a calculation processing operation of the calculation device is prohibited for a predetermined time when a behavior of the vehicle is not in a stable state.

Further, it is desirable that when the measurement object is a vehicle, a calculation processing operation of the calculation device is prohibited when a steering angle of a steering wheel or a turning angle of a wheel is equal to or larger than a predetermined angle.

Further, it is desirable that a calculation processing operation of the calculation device is executed at an early stage of an acceleration operation or a deceleration operation executed by the acceleration/deceleration device.

ADVANTAGEOUS EFFECTS OF INVENTION

When an actual acceleration/deceleration direction of the measurement object is different from an acceleration/deceleration direction shown by the detection value of the acceleration/deceleration detector in a state that the measurement object is accelerated or decelerated, the acceleration/deceleration detecting system according to the present invention causes the detection value to be determined as the offset error or the detection error of the acceleration/deceleration detector and can determine that the detection value at the time is influenced by the offset error and the like. Further, since the acceleration/deceleration detecting system can obtain a more proper offset error and the like by the determination, the acceleration/deceleration detecting system can obtain a correct detection result of the acceleration/deceleration by correcting the detection value of the acceleration/deceleration detector using the offset error and the like. Accordingly, an apparatus, which performs a control, a calculation, and the like using the detection information of the acceleration/deceleration detector, can execute a highly accurate control and calculation using the detection result of the acceleration/deceleration detecting system.

BRIEF DESCRIPTION OF DRAWINGS

FIG. 6 is a flowchart illustrating a specific calculation processing operation at the time of acceleration.

FIG. 7 is a flowchart illustrating the specific calculation processing operation at the time of deceleration.

DESCRIPTION OF EMBODIMENT

An acceleration/deceleration detecting system according to the present invention includes an acceleration/deceleration detector which is disposed in a measurement object and detects acceleration/deceleration of the measurement object, an acceleration/deceleration device which accelerates or decelerates the measurement object, and a calculation device which performs a predetermined calculation when an actual acceleration/deceleration direction of the measurement object is different from an acceleration/deceleration direction of a detection value of the acceleration/deceleration detector in a state that the measurement object is accelerated or decelerated by the acceleration/deceleration device. The calculation device is caused to determine, for example, that the detection value of the acceleration/deceleration detector in such a case is the offset error or the detection error of the acceleration/deceleration detector. According to the acceleration/deceleration detecting system, it can be determined with a high accuracy that the detection value of the acceleration/deceleration detector receives an influence of the offset error or the detection error. Further, the calculation device is caused to determine the offset error or the detection error of the acceleration/deceleration detector in that case and to correct the detection value of the acceleration/deceleration detector based on the offset error or the detection error. According to the acceleration/deceleration detecting system, an accurate detection result of the acceleration/deceleration detector can be obtained. An embodiment of the acceleration/deceleration detecting system according to the present invention will be explained below in detail based on drawings. Note that the present invention is not limited by the embodiment.

Embodiment

An embodiment of the acceleration/deceleration detecting system according to the present invention will be explained based on FIGS. 1 to 7. The embodiment will be explained exemplifying a vehicle as a measurement object.

Figure 1:
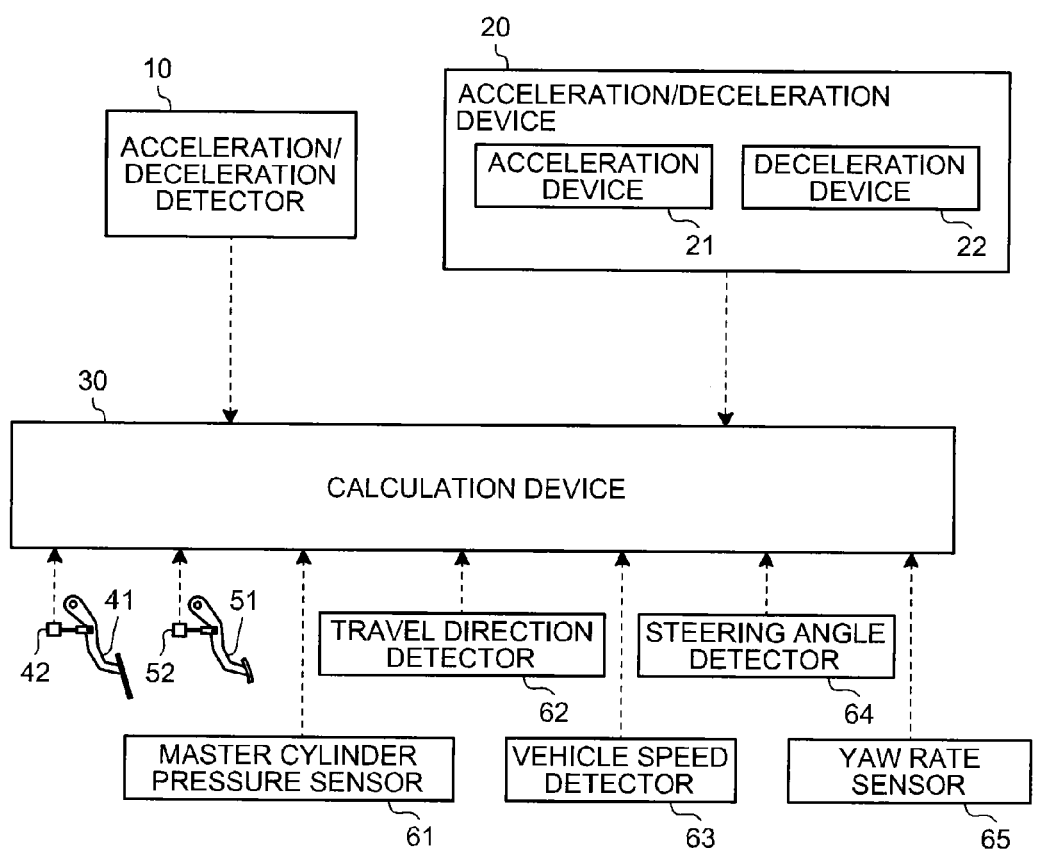
FIG. 1 is a block diagram illustrating a configuration of an acceleration/deceleration detecting system according to the present invention.

As shown in FIG. 1, the acceleration/deceleration detecting system of the embodiment includes an acceleration/deceleration detector 10 which is disposed in a vehicle and detects acceleration/deceleration of the vehicle, an acceleration/deceleration device 20 which accelerates or decelerates the vehicle, and a calculation device 30 which performs a predetermined calculation when an actual acceleration/deceleration direction is different from an acceleration/deceleration direction of a detection value of the acceleration/deceleration detector 10 in a state that the vehicle is accelerated or decelerated by the acceleration/deceleration device 20.

The acceleration/deceleration detector 10 in the example is an acceleration sensor and the like for detecting forward/backward acceleration of the vehicle and outputs a positive detection signal when the detected acceleration is on an acceleration side and outputs a negative detection signal when the detected acceleration is on a deceleration side.

The acceleration/deceleration device 20 in the example may make use of an acceleration device 21 and a deceleration device 22 on the vehicle side because the measurement object is a vehicle. The acceleration device 21 is an accelerator pedal 41, a driving force source for generating driving force in response to an operation amount of the accelerator pedal 41, and the like. Further, the deceleration device 22 is a brake pedal 51, a braking device for generating braking force in response to an operation amount of the brake pedal 51, and the like. Note that when the acceleration/deceleration device 20 is not disposed in the measurement object itself, the acceleration/deceleration device 20 for the system is prepared separately.

A detection signal of the acceleration/deceleration detector 10 is input to the calculation device 30. When the calculation device 30 receives a positive detection signal, the calculation device 30 can basically determine that the acceleration/deceleration detected by the acceleration/deceleration detector 10 is in an acceleration direction, and when the calculation device 30 receives a negative detection signal, the calculation device 30 can determine that the acceleration/deceleration detected by the acceleration/deceleration detector 10 is in a deceleration direction.

Further, the calculation device 30 is input with a control signal or a control state signal of the acceleration/deceleration device 20. The control signal or the control state signal of the acceleration/deceleration device 20 are signals which can determine at least that the vehicle is in an acceleration state or in a deceleration state. Here, in the embodiment, since the acceleration/deceleration device 20 (the acceleration device 21 and the deceleration device 22) previously mounted to the vehicle is used, an electronic control unit (ECU) of the vehicle has the control signal or the control state signal of the acceleration/deceleration device 20. Accordingly, the calculation device 30 is preferably caused to receive the control signal or the control state signal of the acceleration/deceleration device 20 from the electronic control unit of the vehicle and to determine whether the vehicle is in the acceleration state or in the deceleration state. Further, in place of the above configuration, the calculation device 30 may be provided as a function of the electronic control unit of the vehicle.

Incidentally, the detection signal of the acceleration/deceleration detector 10 described above is ordinarily added with an offset component due to an offset error inherent to the detection signal. Accordingly, the detection value does not become a correct value which represents an actual vehicle state, a road surface state, and the like unless the offset component is removed from the detection signal of the acceleration/deceleration detector 10. Further, the acceleration/deceleration detector 10 may cause a detection error to the detection value due to deterioration across ages, a faulty operation of a detection element, an abnormal value of an applied voltage, and the like. Accordingly, unless the detection error is corrected, the detection value does not become the correct value. The acceleration/deceleration detecting system of the embodiment is configured to be able to properly determine an influence of the offset error and the detection error of the acceleration/deceleration detector 10 described above and to obtain a correct detection result of the acceleration/deceleration.

The acceleration/deceleration detector 10 has such output characteristics that when the vehicle dynamically moves, the acceleration/deceleration detector 10 outputs the detection signal (positive detection signal in the example) on the acceleration side when the vehicle accelerates and outputs the detection signal (negative detection signal in the example) on the deceleration side when the vehicle decelerates without depending on a road surface gradient at the time. Accordingly, when the driver depresses the accelerator pedal 41 and accelerates the vehicle, the acceleration/deceleration detector 10 outputs the positive detection signal, whereas when the driver depresses the brake pedal 51 and decelerates the vehicle, the acceleration/deceleration detector 10 outputs the negative detection signal. Accordingly, when a detection signal against the basic output characteristics is output, that is, when a detection signal in which positive and negative are reversed against the basic output characteristics is output, it can be said that the detection signal is the offset error or the detection error.

Thus, the acceleration/deceleration detecting system of the embodiment is configured to obtain a correct detection result of the acceleration/deceleration by making use of the basic output characteristics of the acceleration/deceleration detector 10. The acceleration/deceleration detecting system determines the offset error or the detection error separately when the vehicle is accelerated and when the vehicle is decelerated.

Whether the vehicle is in the acceleration state or in the deceleration state is preferably determined as described below. The calculation device 30 determines that the vehicle is in the acceleration state when, for example, an accelerator opening degree gradient dθacc is a value showing acceleration. The accelerator opening degree gradient dθacc is determined by making use of a detection value of an accelerator operation amount detector 42 for detecting an operation amount of the accelerator pedal 41 such as an accelerator opening degree sensor and shows a change amount of the accelerator operation amount. The calculation device 30 here is caused to determine that the vehicle is in the acceleration state when the accelerator opening degree gradient dθacc shows a positive value. Further, the calculation device 30 may be caused to determine whether or not the vehicle is in the acceleration state using a throttle opening gradient (a change amount of degree of opening of a throttle valve) in place of the accelerator opening degree gradient dθacc. In contrast, the calculation device 30 determines that the vehicle is in the deceleration state when a brake operation amount gradient dθbr or a master cylinder pressure gradient dPmc has a value showing deceleration. The gradient dθbr of the brake operation amount is determined by making use of a detection value of a brake operation amount detector 52 for detecting the operation amount of the brake pedal 51 such as a brake pedal stroke sensor and shows a change amount of a brake operation amount θbr. Further, the master cylinder pressure gradient dPmc is determined by making use of a detection value of a master cylinder pressure sensor 61 and shows a change amount of a master cylinder pressure Pmc. The calculation device 30 here is caused to determine that the vehicle is in the deceleration state when the brake operation amount gradient dθbr or the master cylinder pressure gradient dPmc shows a positive value.

First, a time at which the vehicle is accelerated will be explained.

When the vehicle is accelerated while travelling forward by operating an accelerator, the positive detection signal must be intrinsically output from the acceleration/deceleration detector 10. From what has been described above, when the negative detection signal is detected at the time, it can be determined that the detection signal is the offset error or the detection error. In contrast, when the vehicle is accelerated while travelling backward by operating the accelerator, the negative detection signal must be intrinsically output from the acceleration/deceleration detector 10. Accordingly, when the positive detection signal is detected at the time, it can be determined that the detection signal is the offset error or the detection error. The calculation device 30 is caused to determine the offset error or the detection error as shown in, for example, flowcharts of FIGS. 2 and 3 making use of the relations.

First, a case that the acceleration/deceleration detector 10 outputs the negative detection signal at the time of acceleration while the vehicle travels forward will be explained based on the flowchart of FIG. 2.

The calculation device 30 determines whether or not the detection signal (that is, an acceleration/deceleration Gx that is the detection value) received from the acceleration/deceleration detector 10 while the vehicle is accelerated is negative, in other words, whether or not the detection signal shows the deceleration direction of the vehicle (step ST1).

Here, when it is determined that the detection signal is not negative, the calculation processing operation is finished. In contrast, when it is determined that the detection signal is negative, the calculation device 30 determines whether or not the vehicle travels forward (step ST2). The determination at step ST2 is performed making use of a detection result of a travel direction detector 62 shown in, for example, FIG. 1. A shift position sensor of, for example, a not illustrated transmission can be used as the travel direction detector 62. The calculation device 30 determines that the vehicle travels forward when a forward travel drive range (D range) is detected and determines that the vehicle travels backward when a backward travel reverse range (R range) is detected, based on a detection value of the shift position sensor.

When the calculation device 30 determines at step ST2 that the vehicle travels in a backward direction, the calculation device 30 determines that the acceleration/deceleration detector 10 outputs a value according to the basic output characteristics and finishes the calculation processing operation. In contrast, when it is determined at step ST2 that the vehicle travels in a forward direction, an acceleration/deceleration direction of the detection value of the acceleration/deceleration detector 10 shows a deceleration direction in spite of the fact that an actual acceleration/deceleration direction in the vehicle is the acceleration direction. Accordingly, in the case, the calculation device 30 determines that the acceleration/deceleration Gx detected by the acceleration/deceleration detector 10 is the offset error or the detection error and sets the acceleration/deceleration Gx (<0) as an error (offset error or detection error) Gminus (step ST3). When the acceleration/deceleration Gx is set, the acceleration/deceleration Gx is guarded by a maximum value in a predicted value of the offset error or the detection error which is estimated as a predicted value when the acceleration/deceleration detector 10 is designed. When, for example, the acceleration/deceleration Gx that is the detection value exceeds the maximum value, it is preferable to set the maximum value as the offset error or the detection error, or to eliminate the offset error and the like at the time once, to execute the calculation processing operation at a next chance, and to cause the offset error and the like to be determined again to enhance an accuracy of the offset error and the like.

For example, the calculation processing operation is repeatedly executed when a correction of the acceleration/deceleration Gx to be described later is permitted. With the operation, while the calculation processing operation is executed, the offset error or the detection error which are dispersed to a large extent may be calculated. Accordingly, while the calculation processing operation is executed, it is preferable that when the offset error or the detection error calculated at a time is larger than that calculated at one step before the time, a new offset error and the like are set, whereas when the offset error and the like at the time is smaller than that calculated at one step before the time, the offset error and the like at the one step before the time is kept at step ST3.

Subsequently, a case that the acceleration/deceleration detector 10 outputs the positive detection signal at the time of acceleration while the vehicle travels backward will be explained based on the flowchart of FIG. 3.

The calculation device 30 determines whether or not the detection signal (the acceleration/deceleration Gx) received from the acceleration/deceleration detector 10 while the vehicle is accelerated is positive, that is, whether or not the detection signal shows the acceleration direction of the vehicle (step ST11).

Here, when it is determined that the detection signal is not positive, the calculation processing operation is finished. In contrast, when it is determined that the detection signal is positive, the calculation device 30 determines whether or not the vehicle travels backward (step ST12).

When the calculation device 30 determines at step ST12 that the vehicle travels in the forward direction, the calculation device 30 determines that the acceleration/deceleration detector 10 outputs the value according to the basic output characteristics and finishes the calculation processing operation. In contrast, when it is determined at step ST12 that the vehicle travels in the backward direction, the acceleration/deceleration direction of the detection value of the acceleration/deceleration detector 10 shows the acceleration direction in spite of the fact that the actual acceleration/deceleration direction in the vehicle is the deceleration direction. Accordingly, in the case, the calculation device 30 determines that the acceleration/deceleration Gx detected by the acceleration/deceleration detector 10 is the offset error or the detection error and sets the acceleration/deceleration Gx (>0) as an error (offset error or detection error) Gplus (step ST13). Also in the case, when the acceleration/deceleration Gx is set, the acceleration/deceleration Gx is guarded by the maximum value in the predicted offset error or the predicted detection error when the acceleration/deceleration detector 10 is designed.

The calculation processing operation is also repeatedly executed when the correction of the acceleration/deceleration Gx to be described later is permitted. Accordingly, while the calculation processing operation is executed, it is preferable that when an offset error or a detection error calculated at a time is larger than that calculated at one step before the time, a new offset error and the like are set, whereas when the offset error and the like at the time is smaller than that calculated at one step before the time, the offset error and the like at the one step before the time is kept at step ST13.

Next, a case that the vehicle is decelerated will be explained.

When the vehicle is decelerated while travelling forward by operating a brake, the negative detection signal must be intrinsically output from the acceleration/deceleration detector 10. From what has been described above, when the positive detection signal is detected at the time, it can be determined that the detection signal is the offset error or the detection error. In contrast, when the vehicle is decelerated while travelling backward by operating the brake, the positive detection signal must be intrinsically output from the acceleration/deceleration detector 10. Accordingly, when the negative detection signal is detected at the time, it can be determined that the detection signal is the offset error or the detection error. The calculation device 30 is caused to determine the offset error or the detection error as shown in, for example, flowcharts of FIGS. 4 and 5 by making use of the relations.

First, a case that the acceleration/deceleration detector 10 outputs the positive detection signal at the time of deceleration while the vehicle travels forward will be explained based on the flowchart of FIG. 4.

The calculation device 30 determines whether or not the detection signal (acceleration/deceleration Gx) received from the acceleration/deceleration detector 10 while the vehicle decelerated is positive, in other words, whether or not the detection signal shows the acceleration direction of the vehicle (step ST21).

Here, when it is determined that the detection signal is not positive, the calculation processing operation is finished. In contrast, when it is determined that the detection signal is positive, the calculation device 30 determines whether or not the vehicle travels forward (step ST22).

When the calculation device 30 determines at step ST22 that the vehicle travels in the backward direction, the calculation device 30 determines that the acceleration/deceleration detector 10 outputs a value according to the basic output characteristics and finishes the calculation processing operation. In contrast, when it is determined at step ST22 that the vehicle travels in the forward direction, the acceleration/deceleration direction of the detection value of the acceleration/deceleration detector 10 shows the acceleration direction in spite of the fact that the actual acceleration/deceleration direction in the vehicle is the deceleration direction. Accordingly, in the case, the calculation device 30 determines that the acceleration/deceleration Gx detected by the acceleration/deceleration detector 10 is the offset error or the detection error and sets the acceleration/deceleration Gx (>0) as the error (offset error or detection error) Gplus (step ST23). Also in the case, when the acceleration/deceleration Gx is set, the acceleration/deceleration Gx is guarded by the maximum value in the predicted offset error or the predict detection error when the acceleration/deceleration detector 10 is designed.

The calculation processing operation is also repeatedly executed when the correction of the acceleration/deceleration Gx to be described later is permitted. Accordingly, while the calculation processing operation is executed, it is preferable that when an offset error or a detection error calculated at a time is larger than that calculated at one step before the time, a new offset error and the like are set, whereas when the offset error and the like at the time is smaller than that calculated at one step before the time, the offset error and the like at one step before the time is kept at step ST23.

Subsequently, a case that the acceleration/deceleration detector 10 outputs the negative detection signal at the time of deceleration while the vehicle travels backward will be explained based on the flowchart of FIG. 5.

The calculation device 30 determines whether or not the detection signal (acceleration/deceleration Gx) received from the acceleration/deceleration detector 10 while the vehicle is accelerated is negative, that is, whether or not the detection signal shows the deceleration direction of the vehicle (step ST31).

Here, when it is determined that the detection signal is not negative, the calculation processing operation is finished. In contrast, when it is determined that the detection signal is negative, the calculation device 30 determines whether or not the vehicle travels backward (step ST32).

When the calculation device 30 determines at step ST32 that the vehicle travels in the forward direction, the calculation device 30 determines that the acceleration/deceleration detector 10 outputs the value according to the basic output characteristics and finishes the calculation processing operation. In contrast, when it is determined at step ST32 that the vehicle travels in the backward direction, the acceleration/deceleration direction of the detection value of the acceleration/deceleration detector 10 shows the deceleration direction in spite of the fact that the actual acceleration/deceleration direction in the vehicle is the acceleration direction. Accordingly, in the case, the calculation device 30 determines that the acceleration/deceleration Gx detected by the acceleration/deceleration detector 10 is the offset error or the detection error and sets the acceleration/deceleration Gx (<0) as the error (offset error or detection error) Gminus (step ST33). Also in the case, when the acceleration/deceleration Gx is set, the acceleration/deceleration Gx is guarded by the maximum value in the predicted offset error or the predict detection error when the acceleration/deceleration detector 10 is designed.

The calculation processing operation is also repeatedly executed when the correction of the acceleration/deceleration Gx to be described later is permitted. Accordingly, while the calculation processing operation is executed, it is preferable that when an offset error or a detection error calculated at a time is larger than that calculated at one step before the time, a new offset error and the like are set, whereas when the offset error and the like at the time is smaller than that calculated at one step before the time, the offset error and the like at the one step before the time is kept at step ST33.

The calculation device 30 corrects the detection value (acceleration/deceleration Gx) of the acceleration/deceleration detector 10 as shown by the following expressions 1, 2 based on the error (offset error or detection error) Gplus, Gminus set as described above.

$$Gx = Gx - G\text{plus} \quad (1)$$

$$Gx = Gx + G\text{minus} \quad (2)$$

As shown above, the acceleration/deceleration detecting system determines the offset error or the detection error in a stable state that the vehicle shows a dynamic movement in accordance with an intention of the driver such as the accelerator operation and the brake operation of the driver and corrects the acceleration/deceleration Gx using the offset error and the like. Accordingly, the acceleration/deceleration detecting system sets a correction prohibition condition and, when the vehicle shows a dynamic behavior against the driver's intention, the acceleration/deceleration detecting system prevents that the acceleration/deceleration Gx is corrected.

The dynamic vehicle behavior against the driver's intention means a state that acceleration/deceleration, which is generated when, for example, an engine brake is generated and the vehicle turns, is unstable. When the engine brake is generated, since deceleration equivalent to the engine brake is included in the detection value of the acceleration/deceleration detector 10, a stable detection signal cannot be obtained from the acceleration/deceleration detector 10, and thus the generation of the engine brake is not suitable for the determination of the offset error or the detection error. Further, when the vehicle turns, since braking force due to a slip angle of wheels (so-called cornering drag) is applied to the vehicle and deceleration equivalent to the deceleration is included in the detection value of the acceleration/deceleration detector 10, the stable detection signal cannot be obtained from the acceleration/deceleration detector 10, and thus the time at which the vehicle turns is not suitable for the determination of the offset error or the detection error. Accordingly, the acceleration/deceleration detecting system sets the time at which the engine brake is generated and the time at which the vehicle turns as the correction prohibition condition.

To eliminate an influence due to the engine brake, the acceleration/deceleration detecting system determines whether or not the correction is prohibited by a vehicle speed V as described later. The vehicle speed V is detected by a vehicle speed detector 63 such as a vehicle speed sensor and a wheel speed sensor. In contrast, to eliminate an influence due to the turning, the acceleration/deceleration detecting system determines whether or not the correction is prohibited by a steering angle θstr of a steering wheel (illustration omitted) or a yaw rate y of the vehicle as described later. The steering angle θstr is detected by a steering angle detector 64 such as a steering angle sensor. Further, the yaw rate y is detected by a yaw rate sensor 65.

Further, even if the driver performs the accelerator operation and brake operation, when the operations are performed abruptly, since the vehicle greatly moves in a pitch direction, the stable detection signal cannot be obtained from the acceleration/deceleration detector 10. Accordingly, the acceleration/deceleration detecting system sets the time at which the accelerator is abruptly operated and the time at which the brake is abruptly operated as the correction prohibition condition. In the case, a counter A is set and the correction of the acceleration/deceleration Gx is prohibited for a predetermined time until the counter A becomes 0. The counter A is set with a correction prohibition time of the acceleration/deceleration Gx which is a time longer than, for example, an accelerator operation time and a brake operation time of the driver.

When the calculation device 30 determines that the accelerator opening degree gradient dθacc exceeds a predetermined value dθacc0 and the accelerator is abruptly operated, the calculation device 30 sets the counter A. Further, when the calculation device 30 determines that the master cylinder pressure gradient dPmc exceeds a predetermined value dPmc0 and the brake is abruptly operated, the calculation device 30 sets the counter A. The predetermined values dθacc0, dPmc0 are preferably set to values smaller than the minimum values of the accelerator opening degree gradient dθacc and the master cylinder pressure gradient dPmc when the vehicle largely moves in the pitch direction in such a degree at which a determination accuracy of the offset error and the like is lowered. The correction of the acceleration/deceleration Gx by the counter may be prohibited when the correction prohibition condition exemplified above is satisfied.

Further, under a predetermined condition, it is difficult to properly correct the acceleration/deceleration Gx based on the offset error or the detection error of the acceleration/deceleration detector 10 described above. For example, both the positive and negative values are not set to the offset error or to the detection error at the same time. Accordingly, when the positive error (offset error or detection error) Gplus and the negative error (offset error or detection error) Gminus are set at the same time, the accuracy of the errors Gplus, Gminus becomes doubtful. The case is when the vehicle travels on a bad road and largely moves in the pitch direction. Accordingly, the case is preferably set to a reset condition (correction prohibition condition). For example, it is preferable to cause the calculation device 30 to eliminate the offset error or the detection error when the condition is satisfied (error Gplus=0 and error Gminus=0) and to cause the calculation device 30 to prohibit the correction of the acceleration/deceleration Gx until the offset error or the detection error is determined again. Here, a counter B is set and the correction of the acceleration/deceleration Gx is prohibited for a predetermined time until the counter B becomes 0. The counter B is set with a correction prohibition time of the acceleration/deceleration Gx which is, for example, at least a time required until a change of pitch of the vehicle due to a road surface is converged.

Further, the reset condition also corresponds to a case that a vehicle behavior changes by a condition other than the accelerator operation and the brake operation of the driver such as when the vehicle travels over a step on a road surface while travelling at a speed higher than a predetermined speed. Accordingly, the calculation device 30 is caused to eliminate the offset error or the detection error when the vehicle speed becomes higher than the predetermined speed. A vehicle speed when the vehicle travels over a step, which is not suitable for the proper correction of the acceleration/deceleration Gx due to, for example, the offset error and the like, is preferably set as the predetermined speed. Also in the case, a counter (which is the same as or different from the counter B) may be set and the correction of the acceleration/deceleration Gx may be prohibited until the counter becomes 0.

A specific example of the contents explained heretofore will be described below in detail.

First, a time at which the vehicle is accelerated by the accelerator operation of the driver will be explained based on a flowchart of FIG. 6.

In a state that the vehicle is accelerated, since a deeper depression of the accelerator pedal 41 by the driver more increases actual acceleration, the detection signal of the acceleration/deceleration detector 10 likely shows the basic output characteristics described above. In contrast, when the acceleration/deceleration detector 10 has the offset error or the detection error, the detection signal in a direction opposite to an actual acceleration direction of the vehicle is likely output from the acceleration/deceleration detector 10 at an earlier stage of the accelerate operation of the vehicle at which the depression amount of the accelerator pedal 41 is small. Accordingly, the calculation device 30 is caused to determine whether or not the accelerator opening degree θacc becomes larger than a predetermined value θacc1 (step ST41) and is caused to capture an early stage of an acceleration operation. The minute accelerator opening degree θacc is set as the predetermined value θacc1 so that the early stage of the acceleration operation can be captured.

When the calculation device 30 determines at step ST41 that the accelerator opening degree θacc does not become larger than the predetermined value θacc1, the calculation device 30 finishes the calculation processing operation once and repeats step ST41.

In contrast, when it is determined at step ST41 that the accelerator opening degree θacc becomes larger than the predetermined value θacc1, the calculation device 30 determines that it is at the early stage of the acceleration operation and determines whether or not the vehicle speed V is lower than a predetermined vehicle speed V1 (step ST42). Step ST42 is to eliminate an influence of the engine brake on the detection signal of the acceleration/deceleration detector 10. In a high vehicle speed region, the engine brake may be applied only by slightly returning the accelerator pedal 41. Accordingly, the vehicle speed V1 is set to a low vehicle speed (for example, 10 km/h) so that the offset error and the like are determined while the vehicle travels at the low speed at which the vehicle behavior is stabilized.

When the calculation device 30 determines at step ST42 that the vehicle speed V is not lower than the predetermined vehicle speed V1, the calculation device 30 determines that there is a possibility that the influence of the engine brake cannot be eliminated, finishes the calculation processing operation once, and returns to step ST41.

In contrast, when the calculation device 30 determines at step ST42 that the vehicle speed V is lower than the predetermined vehicle speed V1, the calculation device 30 determines whether or not the accelerator opening degree gradient dθacc becomes larger than 0, that is, whether or not the accelerator operation of the driver is an operation to the acceleration side and the vehicle is in a state in which the acceleration is increased (step ST43). Here, in a so-called electronic control throttle in which the accelerator pedal 41 is not mechanically connected to a throttle valve (illustration omitted), since the accelerator opening degree θacc and a throttle valve opening degree and the accelerator opening degree gradient dθacc and the throttle valve opening gradient are not always in a proportional relation, step ST43 is not necessary. Note that when the determination of the acceleration operation of the driver (acceleration state of the vehicle) is taken into consideration, the calculation device 30 may be caused to perform the same determination by taking, for example, a change of a wheel speed and the like into consideration.

When the calculation device 30 determines at step ST43 that the accelerator opening degree gradient dθacc is not larger than 0 and the operation to the acceleration side is not performed, the calculation device 30 finishes the calculation processing operation once and returns to step ST41.

In contrast, when the calculation device 30 determines at step ST43 that the accelerator opening degree gradient dθacc is larger than 0, the calculation device 30 determines whether or not the counter A described above is 0 as well as the counter B is also 0 (step ST44). That is, at step ST44, the calculation device 30 determines whether or not the vehicle is in the vehicle stable state in which the acceleration is not abruptly changed by the pitching motion of the vehicle caused by that the accelerator is abruptly operated as well as the vehicle is not in the travel condition in which the vehicle travels on the bad road to which both the positive and negative errors (offset errors or detection errors) Gplus, Gminus are calculated, and the like. Note that when the counter A is not set, it is preferable to eliminate the time at which the accelerator is abruptly operated by comparing the accelerator opening degree gradient dθacc with a predetermined value.

At step ST44, when it is determined that both the counters A, B do not become 0 and the vehicle is not in the stable state, the calculation device 30 finishes the calculation processing operation once and returns to step ST41.

In contrast, when the calculation device 30 determines at step ST44 that both the counters A, B become 0 and the vehicle is in the stable state, the calculation device 30 determines whether or not the vehicle speed V is higher than a predetermined vehicle speed V2 (step ST45). Step ST45 is to eliminate an influence, which is caused by a shock when the vehicle stops, on the detection signal of the acceleration/deceleration detector 10. Accordingly, the predetermined vehicle speed V2 is set to a vehicle speed lower than the predetermined vehicle speed V1 described above (for example, 3 km/h).

When the calculation device 30 determines at step ST45 that the vehicle speed V is not higher than the predetermined vehicle speed V2, the calculation device 30 determines that there is a possibility that the influence of the shock when the vehicle stops cannot be eliminated, finishes the calculation processing operation once, and returns to step ST41.

In contrast, when the calculation device 30 determines at step ST45 that the vehicle speed V is higher than the predetermined vehicle speed V2, the calculation device 30 determines whether or not an absolute value of the acceleration/deceleration Gx detected by the acceleration/deceleration detector 10 is smaller than a predetermined value Gx1 (>0) (step ST46) and eliminates a time when a road surface has a steep gradient. This is because when the road surface has the steep gradient, the detection signal of the acceleration/deceleration detector 10 shows the basic output characteristics. Accordingly, as to the predetermined value Gx1, it is preferable to set a value smaller than an absolute value of a minimum acceleration/deceleration Gx at which the detection signal shows the basic output characteristics.

When it is determined at step ST46 that the absolute value of the acceleration/deceleration Gx is not smaller than the predetermined value Gx1 and the road surface becomes the steep gradient, the calculation device 30 finishes the calculation processing operation once and returns to step ST41.

In contrast, when it is determined at step ST46 that the absolute value of the acceleration/deceleration Gx is smaller than the predetermined value Gx1, the calculation device 30 determines whether or not the vehicle is being turned (step ST47). The determination at step ST47 is performed by determining whether or not an absolute value of the steering angle θstr of the steering wheel is smaller than a predetermined angle θstr1 or whether or not an absolute value of the yaw rate y is smaller than a predetermined value y1. It is preferable to set a value smaller than a minimum value of the absolute value of the steering angle θstr when the cornering drag is applied to the vehicle and a value smaller than a minimum value of an absolute value of the yaw rate y as the predetermined angle θθstr1 and the predetermined value y1. Further, at step ST47, the determination may be performed by making use of the information of the steering angle of the wheels.

When the calculation device 30 determines at step ST47 that a turning operation is performed in such a degree that the cornering drag is applied to the vehicle, the calculation device 30 finishes the calculation processing operation once and returns to step ST41.

In contrast, when the calculation device 30 determines at step ST47 that the turning operation is not performed in such a degree that the cornering drag is applied to the vehicle, The calculation device 30 determines whether or not the brake operation is not performed by the driver (whether or not the brake is turned off) (step ST48). Step ST48 is to eliminate a state that the driver performs the accelerator operation and the brake operation at the same time.

When the calculation device 30 determines at step ST48 that the brake operation is performed (the brake is turned on), the calculation device 30 finishes the calculation processing operation once and returns to step ST41.

In contrast, when the calculation device 30 determines at step ST48 that the brake operation is not performed (the brake is turned off), the calculation device 30 permits to correct the acceleration/deceleration Gx (step ST49).

Figure 2:
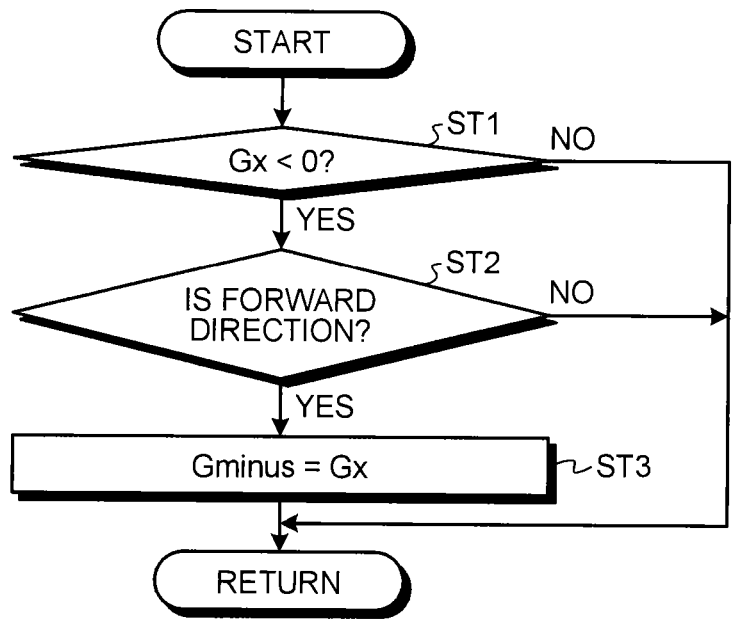
FIG. 2 is a flowchart illustrating a calculation of an offset error or a detection error when an acceleration/deceleration detector outputs a negative detection signal at the time of acceleration while a vehicle travels forward.
Figure 3:
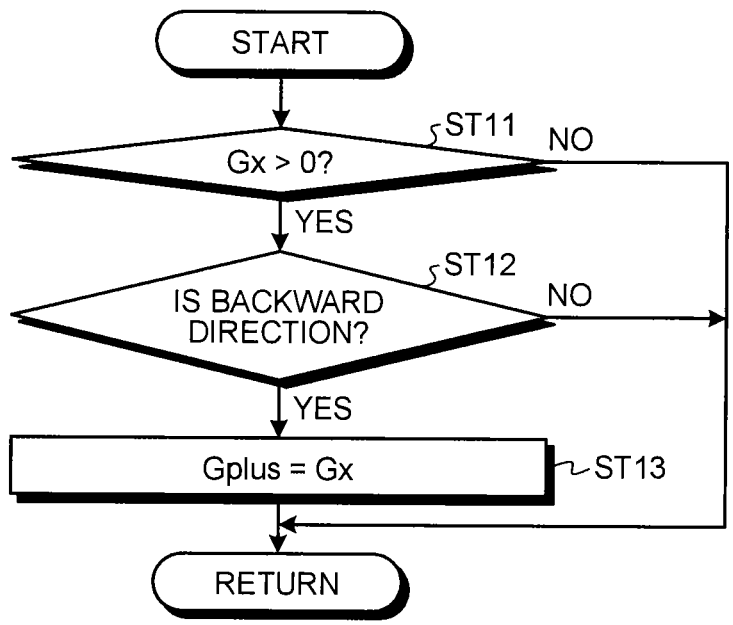
FIG. 3 is a flowchart illustrating the calculation of the offset error or the detection error when the acceleration/deceleration detector outputs a positive detection signal at the time of acceleration while the vehicle travels backward.

After it is permitted to correct the acceleration/deceleration Gx, the calculation device 30 calculates the error (offset error or detection error) Gplus, Gminus by the flowchart of FIG. 2 or FIG. 3 described above and corrects the acceleration/deceleration Gx based on the error (offset error or detection error) Gplus, Gminus.

A series of the calculation processing operations is executed each time, for example, the accelerator opening degree θacc is detected.

Subsequently, a time when the vehicle is decelerated by the brake operation by the driver will be explained based on a flowchart of FIG. 7.

In a state that the vehicle performs a deceleration operation, the deeper the brake pedal 51 is depressed by the driver, the more actual deceleration increases. Thus the detection signal of the acceleration/deceleration detector 10 likely shows the basic output characteristics. In contrast, when the acceleration/deceleration detector 10 has the offset error or the detection error, the detection signal in the direction opposite to the actual acceleration direction of the vehicle is likely output from the acceleration/deceleration detector 10 at an earlier stage of the accelerate operation of the vehicle at which the depression amount of the brake pedal 51 is small. Accordingly, the calculation device 30 is caused to determine whether or not, for example, the master cylinder pressure Pmc becomes larger than the predetermined value Pmc1 (step ST51) and is caused to capture the early stage of the deceleration operation. The minute master cylinder pressure Pmc is set as the predetermined value Pmc1 so that the early stage of the deceleration operation can be captured.

When the calculation device 30 determines at step ST51 that the master cylinder pressure Pmc does not become larger than the predetermined value Pmc1, the calculation device 30 finishes the calculation processing operation once and repeats step ST51.

In contrast, when it is determined at step ST51 that the master cylinder pressure Pmc becomes larger than the predetermined value Pmc1, the calculation device 30 determines that it is the early stage of the deceleration operation and determines whether or not the master cylinder pressure gradient dPmc becomes larger than 0, that is, whether or not the brake operation of the driver is an operation to the deceleration side and the vehicle is in a state that the deceleration is increased (step ST52).

When the calculation device 30 determines at step ST52 that the master cylinder pressure gradient dPmc is not larger than 0 and the operation to the deceleration side is not performed, the calculation device 30 finishes the calculation processing operation once and returns to step ST51.

In contrast, when the calculation device 30 determines at step ST52 that the master cylinder pressure gradient dPmc is larger than 0, the calculation device 30 determines whether or not the counter A described above is 0 as well as the counter B is also 0 (step ST53). That is, at step ST53, the calculation device 30 determines whether or not the vehicle is in a vehicle stable state in which the deceleration is not abruptly changed by the pitching motion of the vehicle caused by that the brake is abruptly operated as well as the vehicle is not in a travel condition in which the vehicle travels on a bad road to which both the positive and negative errors (offset errors or detection errors) Gplus, Gminus are calculated, and the like. Note that when the counter A is not set, it is preferable to eliminate the time at which the brake is abruptly operated by comparing the master cylinder pressure gradient dPmc with the predetermined value.

At step ST53, when it is determined that any of the counters A, B does not become 0 and the vehicle is not in the stable state, the calculation device 30 finishes the calculation processing operation once and returns to step ST51.

In contrast, when the calculation device 30 determines at step ST53 that both the counters A, B become 0 and the vehicle is in the stable state, the calculation device 30 determines whether or not the vehicle speed V is higher than the predetermined vehicle speed V2 (step ST54). Here, although the predetermined vehicle speed V2 which is the same as that at the time of acceleration is used, a different predetermined vehicle speed may be set for the time of deceleration.

When the calculation device 30 determines at step ST54 that the vehicle speed V is not higher than the predetermined vehicle speed V2, the calculation device 30 determines that there is a possibility that the influence of the shock when the vehicle stops cannot be eliminated, finishes the calculation processing operation once, and returns to step ST51.

In contrast, when the calculation device 30 determines at step ST54 that the vehicle speed V is higher than the predetermined vehicle speed V2, the calculation device 30 determines whether or not the absolute value of the acceleration/deceleration Gx detected by the acceleration/deceleration detector 10 is smaller than the predetermined value Gx1 (>0) (step ST55) and eliminates the time when the road surface has the steep gradient.

When it is determined at step ST55 that the absolute value of the acceleration/deceleration Gx is not smaller than the predetermined value Gx1 and the road surface has not the steep gradient, the calculation device 30 finishes the calculation processing operation once returns to step ST51.

In contrast, when it is determined at step ST55 that the absolute value of the acceleration/deceleration Gx is smaller than the predetermined value Gx1 and the road surface does not have the steep gradient, the calculation device 30 determines whether or not the vehicle is being turned (step ST56). The determination at step ST56 is performed likewise at the time of acceleration.

When the calculation device 30 determines at step ST56 that the turning operation is performed in such a degree that the cornering drag is applied to the vehicle, the calculation device 30 finishes the calculation processing operation once and returns to step ST51.

In contrast, when the calculation device 30 determines at step ST56 that the turning operation is not performed in such a degree that the cornering drag is applied to the vehicle, the calculation device 30 determines whether or not the accelerator operation by the driver is performed (whether or not the accelerator is turned off) (step ST57). Step ST57 is to eliminate the state that the driver performs the accelerator operation and the brake operation at the same time.

When the calculation device 30 determines at step ST57 that the accelerator operation is performed (the accelerator is turned on), the calculation device 30 finishes the calculation processing operation once and returns to step ST51.

In contrast, when the calculation device 30 determines at step ST57 that the accelerator operation is not performed (the accelerator is turned off), the calculation device 30 permits to correct the acceleration/deceleration Gx (step ST58).

Figure 4:
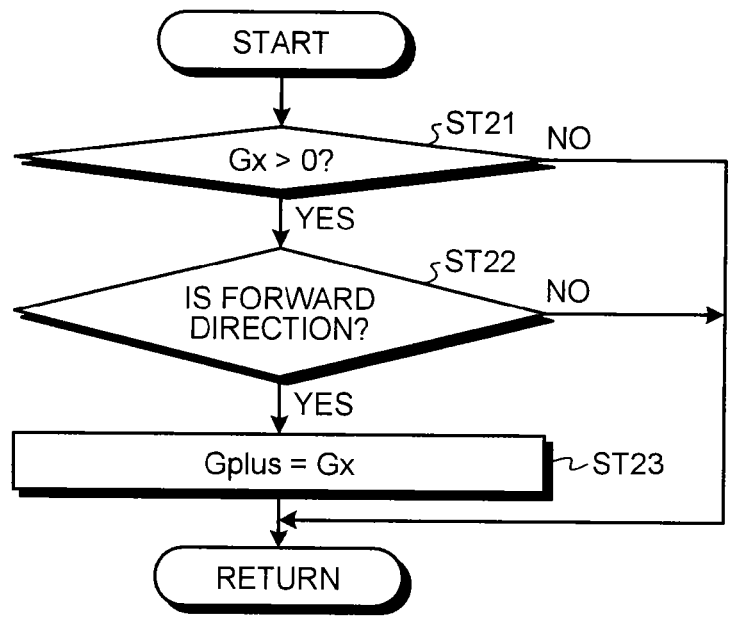
FIG. 4 is a flowchart illustrating the calculation of the offset error or the detection error when the acceleration/deceleration detector outputs the positive detection signal at the time of deceleration while the vehicle travels forward.
Figure 5:
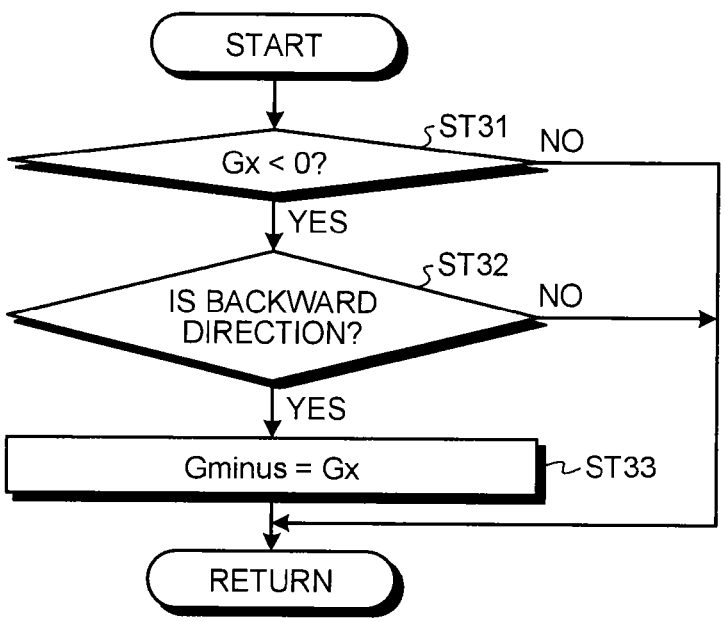
FIG. 5 is a flowchart illustrating the calculation of the offset error or the detection error when the acceleration/deceleration detector outputs the negative detection signal at the time of deceleration while the vehicle travels backward.

After it is permitted to correct the acceleration/deceleration Gx, the calculation device 30 calculates the error (offset error or detection error) Gplus, Gminus by the flowchart of FIG. 4 or FIG. 5 described above and corrects the acceleration/deceleration Gx based on the error (offset error or detection error) Gplus, Gminus.

A series of the calculation processing operations is executed each time, for example, the master cylinder pressure Pmc is detected.

As described above, the acceleration/deceleration detecting system of the embodiment can properly determine the offset error or the detection error of the acceleration/deceleration detector 10 and can derive a proper detection result of the acceleration/deceleration Gx by correcting the acceleration/deceleration Gx which is the detection value of the acceleration/deceleration detector 10 using the offset error or the detection error. Further, the acceleration/deceleration detecting system can perform the determination, that is, the calculation of the offset error or the detection error in a short time. Furthermore, since the acceleration/deceleration detecting system can determine the offset error and the like when the vehicle starts from a stop state or when the brake is operated thereafter, the acceleration/deceleration detecting system can obtain a proper offset error and the like at, for example, an early stage after the engine starts.

From what has been described above, the acceleration/deceleration detecting system can contribute to an improvement of accuracy of a control, a calculation, and the like by making use of the information of the acceleration/deceleration Gx. For example, the vehicle may be mounted with a hill start aid device (so-called hill start assist device) for assisting the vehicle when it starts on an up-slope road. The hill start aid device prevents the vehicle from moving downward by generating predetermined braking force even if the driver disengages a foot from the brake pedal 51 when the vehicle starts on the up-slope road. Accordingly, in the hill start aid device, since it is necessary to set appropriate target braking force in just proportion, it is important to increase an estimation accuracy of a gradient of the up-slope road. Here, conventionally, to estimate the gradient of the up-slope road, for example, the detection value of the acceleration/deceleration detector 10 is used. In contrast, the hill start aid device can accurately estimate the gradient of the up-slope road making use of a proper detection result of the acceleration/deceleration Gx detected by the acceleration/deceleration detecting system of the embodiment.

Industrial Applicability

As described above, the acceleration/deceleration detecting system according to the present invention is useful as a technology for determining the detection error or the offset error of the acceleration/deceleration detector with a high accuracy and increasing the accuracy of the detection result of the acceleration/deceleration.

Reference Signs List

10 ACCELERATION/DECELERATION DETECTOR
20 ACCELERATION/DECELERATION DEVICE

30 CALCULATION DEVICE
42 ACCELERATOR OPERATION AMOUNT DETECTOR
52 BRAKE OPERATION AMOUNT DETECTOR
61 MASTER CYLINDER PRESSURE SENSOR
62 TRAVEL DIRECTION DETECTOR
63 VEHICLE SPEED DETECTOR
64 STEERING ANGLE DETECTOR
65 YAW RATE SENSOR

The invention claimed is:

1. An acceleration/deceleration detecting system comprising:
an acceleration/deceleration detector configured to be disposed in a measurement object and detect acceleration/deceleration of the measurement object;
an acceleration/deceleration device configured to accelerate or decelerate the measurement object; and
a calculation device configured to set a detection value of the acceleration/deceleration detector as an offset error or a detection error of the acceleration/deceleration detector, when an actual acceleration/deceleration direction of the measurement object is different from an acceleration/deceleration direction shown by a detection value of the acceleration/deceleration detector in a state that the measurement object is accelerated or decelerated by the acceleration/deceleration device operated by a driver.

2. The acceleration/deceleration detecting system according to claim 1, wherein the calculation device corrects the detection value of the acceleration/deceleration detector based on the offset error or the detection error.

3. The acceleration/deceleration detecting system according to claim 2, wherein when the measurement object is a vehicle, a calculation processing operation of the calculation device is executed when a behavior of the vehicle is in a stable state.

4. The acceleration/deceleration detecting system according to claim 2, wherein when the measurement object is a vehicle, a calculation processing operation of the calculation device is prohibited for a predetermined time when a behavior of the vehicle is not in a stable state.

5. The acceleration/deceleration detecting system according to claim 2, wherein when the measurement object is a vehicle, a calculation processing operation of the calculation device is prohibited when a steering angle of a steering wheel or a turning angle of a wheel is equal to or larger than a predetermined angle.

6. The acceleration/deceleration detecting system according to claim 2, wherein a calculation processing operation of the calculation device is executed at an early stage of an acceleration operation or a deceleration operation executed by the acceleration/deceleration device.

7. The acceleration/deceleration detecting system according to claim 1, wherein when the measurement object is a vehicle, a calculation processing operation of the calculation device is executed when a behavior of the vehicle is in a stable state.

8. The acceleration/deceleration detecting system according to claim 1, wherein when the measurement object is a vehicle, a calculation processing operation of the calculation device is prohibited for a predetermined time when a behavior of the vehicle is not in a stable state.

9. The acceleration/deceleration detecting system according to claim 1, wherein when the measurement object is a vehicle, a calculation processing operation of the calculation device is prohibited when a steering angle of a steering wheel or a turning angle of a wheel is equal to or larger than a predetermined angle.

10. The acceleration/deceleration detecting system according to claim 1, wherein a calculation processing operation of the calculation device is executed at an early stage of an acceleration operation or a deceleration operation executed by the acceleration/deceleration device.

* * * * *